Patented Sept. 2, 1924.

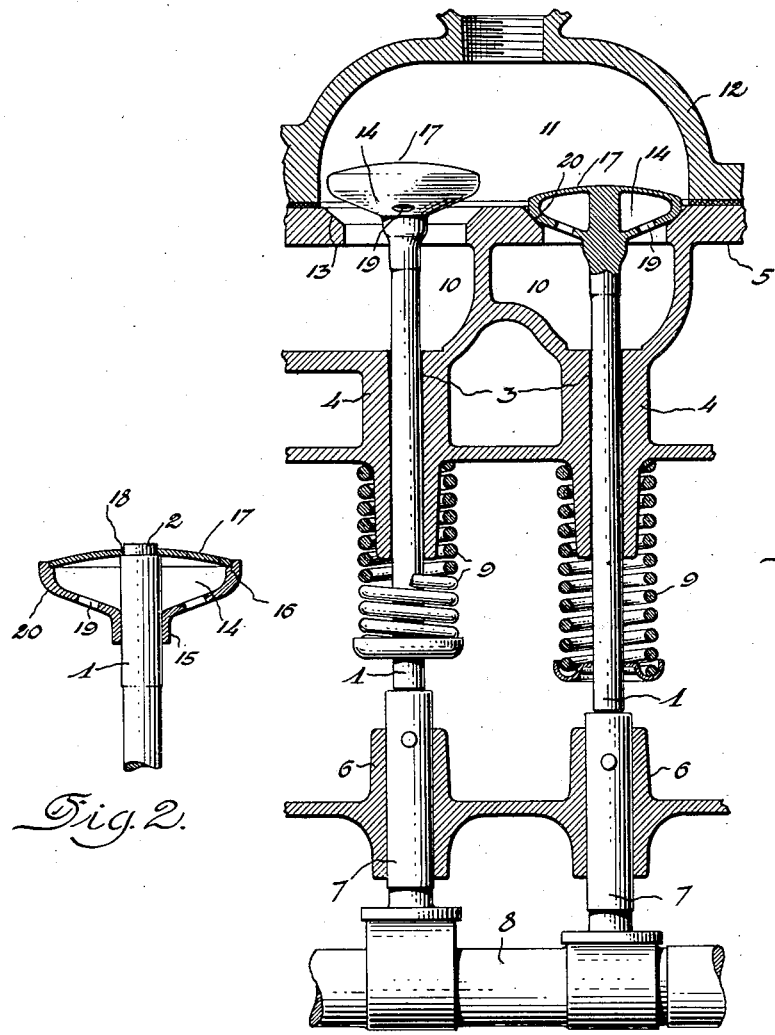
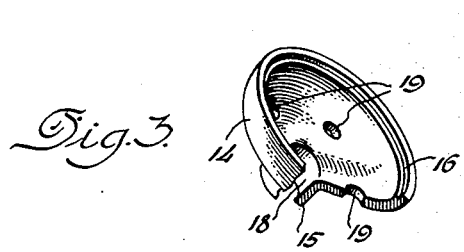
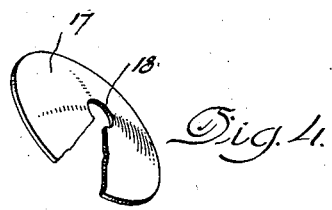

1,506,900

UNITED STATES PATENT OFFICE.

ADOLPH GREINER, OF DETROIT, AND CORNELIUS J. LONG, OF GROSSE POINTE SHORES, MICHIGAN.

VALVE.

Application filed June 29, 1922. Serial No. 571,588.

*To all whom it may concern:*

Be it known that we, (a) ADOLPH GREINER and (b) CORNELIUS J. LONG, citizens of the United States of America, (a) residing at Detroit, county of Wayne, State of Michigan, and (b) at Grosse Pointe Shores, in the county of Wayne and State of Michigan, have invented certain new and useful Improvements in Valves, of which the following is a specification, reference being had therein to the accompanying drawings.

This invention relates to puppet valves specially designed for internal combustion engines, as the power plants of automobiles and other vehicles, although the puppet valves are capable of general use.

Our invention aims to provide a puppet valve that will be self adjusting relative to a valve seat and thus insure minimum leakage, if any, about the valve. To make the valve self adjusting, we shape the valve head so that it may have practically an edge contact with a valve seat, and should there be any irregularities in the surface of the valve seat the valve head may oscillate, rock or shift to find a perfect seat.

Our invention further aims to provide an engine puppet valve with a hollow head that will serve for heating gases and dissipating the heat of an engine. For instance, raw or wet gases may enter the valve head heated by the engine and such gases be heated by conduction or by impinging against the valve head, thus assisting in vaporizing the gases or fuel, drying the gases or fuel, and placing the gases or fuel in better condition for detonation. Then again, the gases or fuel entering the head and absorbing heat tends to cool the valve head or engine parts contacting therewith, and all of this contributes to a higher degree of efficiency in connection with an internal combustion engine.

Our invention further aims to provide a puppet valve that may be advantageously used in connection with the engine of a well known automobile, the valves being designed to replace the present valves without any change in the engine construction. In order that the valves can be manufactured at a comparatively small cost, we have resorted to a novel construction which will be hereinafter specifically described and then claimed.

Reference will now be had to the drawing, wherein—

Figure 1 is a vertical sectional view of a portion of an engine provided with puppet valves in accordance with our invention, one of said valves being open, the other closed;

Fig. 2 is a vertical sectional view of a puppet valve head showing the manner in which head parts are assembled prior to being made integral;

Fig. 3 is a perspective view of one head part, and

Fig. 4 is a similar view of another head part.

In the drawing, the reference numeral 1 denotes a valve stem having its upper end reduced or provided with a button 2 and the intermediate portion of said valve stem is reduced the fractional part of an inch, as at 3, so that said valve stem may have a loose fit or clearance in a guide 4 forming part of an engine cylinder block 5. Such clearance prevents sticking of the valve rods and permits oscillation thereof for self adjustment. In addition to the guides 4 there are tappet guides 6 for tappets 7 actuated by a cam shaft 8 to raise the valve rods 1 and associated with said valve rods are coiled expansion springs 9 holding the valve rods normally lowered and the tappet 7 constantly in engagement with the cams of the cam shaft 8.

The engine cylinder block 5 also includes intake and exhaust passages or chambers 10 communicating with engine cylinders (not shown). The passages or chambers 10 are adapted to communicate with a chamber 11 in a head 12 mounted on the cylinder block and the top of the cylinder block has valve seats 13 for valves on the valve rods 1.

Such valve comprises a dished or concavo-convex body 14 provided with a concentric sleeve portion 15 which is mounted on the valve rod 1 between its reduced portion 3 and the reduced portion 2. The inner wall of the valve body 14 has an annular end seat 16 for a convex closure or disk 17 provided with a central opening 18 to receive the reduced end or button 2 of the valve rod 1. The disk or closure 17 has its peripheral edges flush with the upper end of the valve body 14 and the bottom of said valve body has a plurality of openings 19 permitting of burned gases, air or other fluid entering the valve body.

The valve parts are assembled on the end of the valve rod and then said valve rod and the piston parts are brazed, welded or otherwise treated until the sleeve portion 15 of the valve body 14 becomes integral with the valve rod; the disk or closure 17 becomes integral with the large end of the valve body, and the reduced end or button 2 becomes integral with the central portion of the disk or closure 17, such an integral or homogeneous structure being shown at the right hand side of Fig. 1. The structure is then as though the hollow valve body was cast integral with the valve rod and just as strong and rigid, and it is in this connection that the valve head may be cast of any material.

We desire to direct attention to the configuration of the valve body. The dished valve body affords a curved or convex annular wall 20 which will present an annular edge contact to the beveled or inclined valve seat 13, in contradistinction to matched like contacting surfaces. This will permit of the valve bodies oscillating or rocking on the valve seats and since the valve rods are somewhat loose in the guides 4 such movement is permissible, so that the self adjusting valves may wear a perfect seat or at least find a seat that will insure minimum leakage, if any, about the valves. Since the valve bodies are hollow the walls thereof can readily expand and contract without any danger of the valves sticking. With the valve rods having portions reduced the thousandth part of an inch, such rods can be readily placed in the valve rod guides of a well known engine, and it has been found that when the valves are used in connection with the engine that greater efficiency is obtained and the life of the valves materially prolonged.

What we claim is:—

1. A valve comprising a rod having an end button, a hollow body having a sleeve portion on said rod adjacent the end button thereof, said hollow body having an annular end seat, and a convex closure disk on the annular end seat of said body and fitting about the end button of said rod, said body and rod and said body and disk, and said disk and said rod end button, being integrally connected.

2. A valve as called for in claim 1, wherein said body has openings to permit of raw or wet gases entering said valve body to be heated thereby and transformed into a dry explosive mixture.

In testimony whereof we affix our signatures in presence of two witnesses.

ADOLPH GREINER.
CORNELIUS J. LONG.

Witnesses:
OTTO F. BARTHEL,
ANNA M. DORR.